United States Patent [19]
Hofbauer

[11] 3,754,535
[45] Aug. 28, 1973

[54] COMBUSTION ENGINE WITH ROTARY PISTON ARRANGEMENT

[75] Inventor: Peter Hofbauer, Wolfsburg, Germany

[73] Assignee: Volkswagenwerk AG, Wolfsburg, Germany

[22] Filed: Oct. 6, 1971

[21] Appl. No.: 186,914

[30] Foreign Application Priority Data
Oct. 10, 1970 Germany............... P 20 49 882.2

[52] U.S. Cl.................. 123/8.13, 123/32, 60/39.61
[51] Int. Cl............................................. F02b 53/08
[58] Field of Search............... 123/8.01, 8.03, 8.05, 123/8.09, 8.13, 32

[56] References Cited
UNITED STATES PATENTS
3,289,646  12/1966  Peras ............................... 123/8.13
3,358,439  12/1967  Castelet ........................... 123/8.05
2,893,360  7/1959   Muller ............................. 123/32

FOREIGN PATENTS OR APPLICATIONS
1,024,504  3/1966  Great Britain................. 123/8.09

Primary Examiner—Clarence R. Gordon
Attorney—Ernest F. Marmorek

[57] ABSTRACT

In a combustion engine having a rotary-type piston mounted for rotation and having a cross sectional area defining a trochoid, an outer housing receiving the piston and being in meshing engagement therewith, the housing having an inner surface which has a cross sectional shape representing the envelope of a trochoid curve and forms a plurality of housing arches which include the combustion chambers in the form of recesses, each chamber being arranged to fall in the half of a housing arch which is first swept by the piston during the relative movement between the housing and the piston.

14 Claims, 5 Drawing Figures

3,754,535

COMBUSTION ENGINE WITH ROTARY PISTON ARRANGEMENT

FIELD OF THE INVENTION

The present invention relates to a combustion engine having a rotary piston in general, and more particularly it relates to a combustion engine having a piston of the circularly displaced type in which the piston has a cross section of a trochoid-shape and wherein an outer housing or cover comes into meshing engagement with the piston, the inner surface of the outer cover having a cross section of the envelope curve of a trochoid and forms housing arches in which the combustion chambers are provided in the form of recesses.

BACKGROUND OF THE INVENTION

It became known in connection with combustion engines having a rotary-type piston of the above described type to arrange the combustion chambers in an off-set fashion in the form of recesses in the housing arches. Such combustion chamber construction is described in German laid-open publications 1,576,202 and 1,576,203.

The reason for such an arrangement according to laid-out publication 1,576,203 is to improve the combustion process by the regulation of the air movement. For this reason the inlet channel when viewed in the direction of the rotation of the piston is upstream or forwardly directed into the combustion chamber in order that each time the inlet control opening becomes connected to the chamber the fresh mixture enters the transversely running combustion space in a tangential fashion and after further rotation of the piston it will excite the edge zone of the circulating air in the combustion space and and increases the created turbulence the axis of which is substantially parallel with the axis of the machine. This affect becomes further increased by the shifting of the combustion chamber to the back half of the outer arch of the cover when viewed in the direction of rotation of the piston and also into a portion of the cover which is swept by the piston at the last instance. At this momentum producing system the channels in the piston are arranged in a manner which is advantageous to the supply efficiency since the fact that the inlet channels terminate in the combustion chamber forwardly or in an upstream fashion when viewed in the direction of the rotation of the piston causes a slight weight of flow and high flow losses. The desire is to attain a high kinetic energy which, however, at the time instant of the ignition has fallen to about one-fourth of its original value. The fact which influences the combustion process is that the fine eddying or turbulence will become lost again. Latest experiments under consideration of the exhaust gas have proved again the long known fact that the charge movement of the mixture, especially the fine eddying or turbulence, has a very determinative influence on the combustion process.

SUMMARY OF THE INVENTION

It is, therefore, an object of the present invention to provide an improved combustion engine having a rotary type piston therein wherein directly before and during the combustion process a considerable charge rotation having fine eddying turbulences therein is produced without effecting the supply efficiency, with an improved structuring of the inlet channel in relation to the charge movement so that it is capable of providing a high supply efficiency.

It is another object of the present invention to provide the improved combustion engine having a rotary type piston therein in which the pressure peak during the combustion process will impart in the combustion chamber to the piston a positive rotational momentum even at the upper dead point of the piston.

According to the present invention the combustion chamber lies in the half of the housing arch which during the relative movement between the housing and the piston becomes first swept by the piston. The inlet is provided when viewed in the direction of the rotation of the piston downstream or in the back and terminates into the combustion chamber. As a result of such structuring of the inlet a high supply efficiency can be attained. The movement of the charge becomes during the compression cycle very favorably improved by the pushing effect. The portion of the piston which performs the compression runs next into the portion of the housing arch in which the combustion chamber lies and forms with the housing arch a nozzle-like inlet for the combustion chamber while still a considerable portion of the gas is undergoing compression in the other portion. This portion of the fresh gas or mixture becomes by the arrangement of the combustion chamber only during the last part of the compression cycle especially strongly forced into the combustion chamber and thereby very high rotational energies are produced which in turn bring about an extremely fine eddying or turbulence in the neighborhood of the ignition instant. The maximum of the rotational energy takes place at the ignition time.

In order to further increase the turbulence the combustion chamber becomes constructed in a roller-shape having an axis which lies parallel with respect to the axis of the excentric shaft of the piston. The combustion chamber is provided at least at its frontal transition to the housing arch with a small radius which in its exact dimensions depends on the thermal load in order to increase the nozzle effect and thereby the creation of the fine eddying turbulence at the beginning part of the combustion chamber. The sparkplug is provided approximately in the region of the axis of the roller-shaped combustion chamber.

In accordance with a further feature of the present invention the combustion chamber will create a layer charge and the combustion chamber by means of a reduction or neck portion is subdivided into an ante - chamber and into a main combustion chamber surrounded by the housing arch and opening into the operating chamber. In the ante-chamber in which the sparkplug is placed an additional amount of fuel is injected. The main combustion space remains with respect to the operating chamber open and becomes supplied with a relatively lean mixture through the inlet channel provided in the piston. The mixture in it can be ignited for example by means of a torch ignition process from the ante-chamber (internal mixture formation). As a further simplification and in another embodiment the ante-chamber is also constructed open with respect to the operating chamber.

The present invention has the advantage with respect to the prior art devices also that the maximum rotational energy of the mixture and thereby the highest fine eddying turbulence occurs in the neighborhood of the ignition instant.

The resultant of the driving forces directly after the ignition, operates as a result of the arrangement of the combustion chamber according to the present invention, at the mid point of the piston and thereby it creates even at the upper dead point a positive rotational momentum. As a result a better uniformity and an improved efficiency of the engine is obtained. In contrast to this in the combustion chamber of the known arrangement a negative rotational momentum is created in the mid point or after the mid point when viewed in the rotation of the piston in the back half of the housing arch at the upper dead point.

A further considerable advantage of the present invention resides in that during the compression cycle the relatively cold fresh mixture when compared with the piston surface will sweep over the hot zones of the piston at a high speed and thereby at a high heat transfer coefficient and, as a result, it cools the piston and, simultaneously contributes to the improvement of the efficiency.

This becomes possible when the engine is constructed according to the present invention and even if the Otto method is used since the danger of knocking will not be present even in the case of extreme turbulences. In contrast to this in the known construction of the combustion chamber the hot portions of the piston which lie across the combustion chamber in the region of the upper dead point are running already in the first part of the expansion stroke under the next radial sealing means into the next chamber and do not contribute anymore to the hydrocarbon oxydation. The radial sealing means are thereby exposed to a high thermal load.

In the engine according to the present invention and, in general in engines of this type the kinematically defined dead space is very small. This fact permits a free selection of the combustion chamber especially then when the mixture control is performed by means of slots in the piston. In connection with this, the combustion chamber according to the present invention is capable of bringing about a layer charge. By means of such layer charge the use of the diesel method becomes possible in which obviously the sparkplug is omitted and the inlet in the piston will feed pure air.

BRIEF DESCRIPTION OF THE DRAWINGS

The invention will become more readily apparent from the following description of preferred embodiments thereof shown in the accompanying drawings, in which.

DESCRIPTION OF THE PREFERRED EMBODIMENTS

Figure 1:
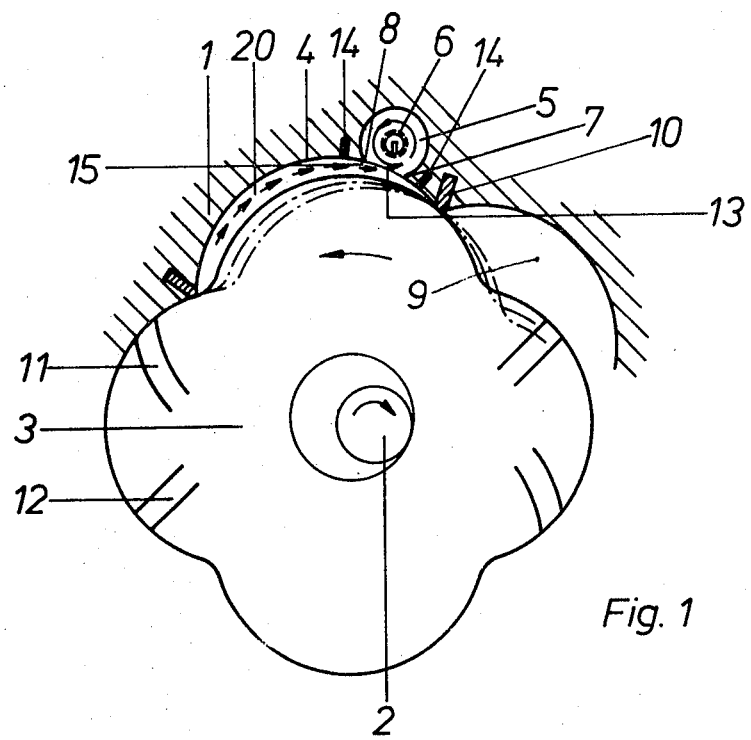
FIG. 1 is a partial cross-sectional view of a planetary or rotary type motor with Ka 5:4.

With reference to FIG. 1 it is seen that in a motor housing 1 a piston 3 is rotated on an excenter shaft 2 in the direction as indicated by the arrow. The housing 1 in its cross sectional showing has the form of the envelope curve of a trochoid. The piston 3 having also in its cross-section a trochoid shape is in meshing engagement with the housing. The combustion space 5 is in the shape of a roller the axis of which lies parallel to the axis of the excentric shaft 2. In the axis of the combustion chamber 5 a sparkplug 6 is arranged which, however, also can be placed vertically with respect to such axis. The front edge 7 of the combustion chamber is rounded off while the other front edge 8 of the combustion chamber 5 is formed with sharp edges. The operating space 9 is limited at one side by the housing arch 4 and on the other side by the radial sealing means 10. The reference numeral 11 identifies the inlet openings running against the direction of the rotation of the piston 3 while the reference numeral 12 identifies the outlet openings. It would be also possible to provide sealing means 14 also at the mouth 13 of the combustion chamber 5 formed with the operating space 9 which would have the purpose to further increase the turbulences when the mixtures are pushed over into the combustion space 5 and in order to longer sustain the positive rotational momentum at the upper dead point.

The operation of the arrangement according to the present invention becomes easily understood on hand of the figures. The piston 3 delivers by means of the inlet opening 11 a high mass of fresh mixture. The movement of the charge is forced then during the further compression cycle by the pushing effect of the piston 3. The part of the piston which performs the compression runs mainly in the part of the operating space 9 which contains the combustion chamber 5 and forms with the housing arch 4 a nozzle-like entry 15 which is further improved by the front sharp edge 8 of the combustion chamber 5 while a considerable part of the fresh mixture becomes further compressed in the part 20 of the operating space 9. This fresh mixture mass becomes first shoved in the last part of the compression cycle at high speed in the combustion chamber 5 and produces thereby at the instant of the ignition a very fine eddying turbulence. The preliminary sealing means 14 aids to longer sustain the pressure in the combustion chamber 5.

Figure 2:
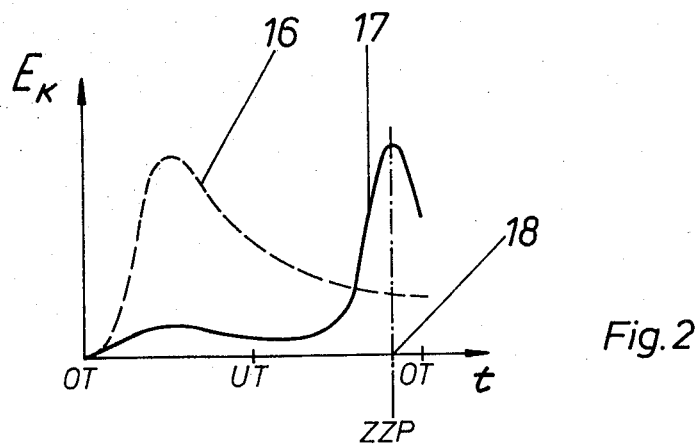
FIG. 2 is a diagramatic comparison of the turbulent energies of the known engines and of the engine according to the present invention.

FIG. 2 illustrates a comparison in a diagramatic form of the turbulence energies produced by the compression cycle in the known machines and in the engines according to the present invention. The abscissa $t$ represents the angle of rotation measured from the upper dead point OT over the lower dead point UT and back to the upper dead point OT while the ordinate $E_k$ represents the kinetic energy of gases within the operating space 9. The dashed line 16 illustrates the energy process in a known machine and from such curve 16 can be easily seen than the highest energy and consequently the fine eddying turbulence is attained already long before the attainment of the ignition instant ZZP and, thereafter it falls very steeply. The curve 17 illustrates the turbulence energy process in an engine according to the present invention. The highest kinetic energy is attained approximately at the point 18 which is the time instant of the ignition ZZP.

Figure 3:
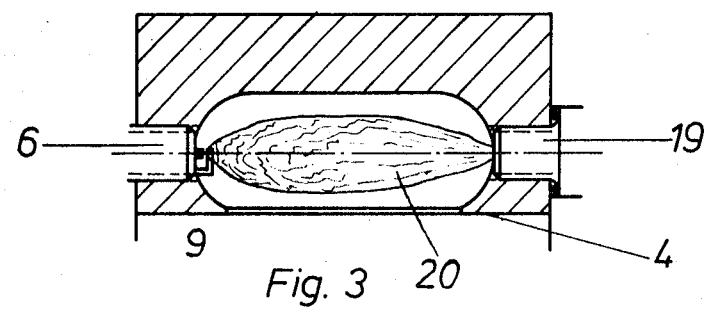
FIGS. 3–5 are different embodiments for the combustion chambers to bring about a layer charge.
Figure 4:
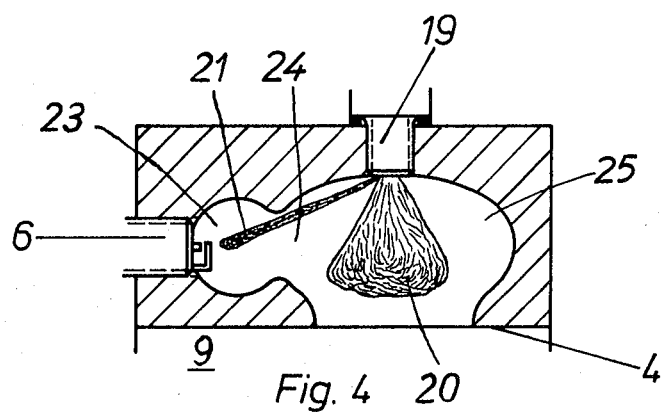
Figure 5:
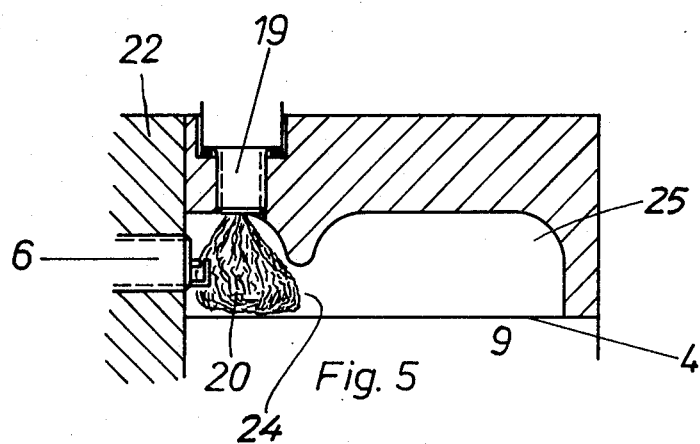

FIGS. 3–6 illustrate the different embodiments of the combustion chambers which are identified by the reference numeral 5 in FIG. 1 and which contribute to the creation of a layer charge according to the present invention. The sparkplug 6 is arranged as shown in FIGS. 3–5 and the reference numeral 19 identifies an additional injection inlet such as in the case of a diesel engine the injection nozzles represent. The reference numeral 20 identifies the fuel and the reference numeral 21 identifies a stream which has been branched off therefrom. The neck portion 24 between the main combustion chamber 25 and the ante-chamber 23, as seen in FIG. 4, is constructed in such a manner that the stream 21 is directed to the sparkplug 6 in a straight line.

The reference numeral 22 identifies a side portion of the engine. A detailed description of the operation of the engine highlighting the operation of the sparkplugs and of the injection openings is believed to be unnecessary.

The dimensional relationship of the ante-chamber 23 and the main combustion chamber 25 can be varied and is not limited to the illustrated dimensional showing of the figures.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a combustion engine, a rotary-type piston mounted for rotation therein, said piston having a cross-sectional area defining a trochoid, an outer housing receiving said piston means and being in meshing engagement with said piston means, said housing having an inner surface having a cross sectional shape representing the envelope of a trochoid and forms a plurality of housing arches, each of said housing arches comprising a combustion chamber in the form of recess, said combustion chamber being arranged in the half of the respective housing arch which is first swept by said piston means during the relative movement between said housing and said piston means.

2. The combination as claimed in claim 1, wherein said combustion chamber is in the shape of a cylinder having an axis lying parallel to the axis about which said piston means rotates, said piston means being rotated about an excenter shaft.

3. The combination as claimed in claim 1, wherein each of said combustion chambers has a first transition part with said housing arch, said first transition part being formed with a small radius.

4. The combination as claimed in claim 2, wherein said combustion chamber comprises a sparkplug means arranged approximately in the axis of said combustion chamber.

5. The combination as claimed in claim 1, wherein said combustion chamber is subdivided into an ante-chamber and into a main combustion chamber, said main combustion chamber opening into an operating space of the engine, said main combustion chamber of the engine being defined by said housing.

6. The combination as claimed in claim 5, wherein said ante-chamber communicates with said main operating space of the engine.

7. The combination as claimed in claim 5, wherein said sparkplug means being provided in said ante chamber and a fuel inlet means providing for a layering of the fuel within said combustion chamber, whereby a portion of said injected fuel is directed to the sparkplug in said ante chamber and the main portion of said fuel is directed into said main combustion chamber.

8. In a motor vehicle, a combustion engine having a rotary-type piston mounted for rotation therein, said piston having a cross-sectional area defining a trochoid, an outer housing receiving said piston means and being in meshing engagement with said piston means, said housing having an inner surface having a cross sectional shape representing the envelope of a trochoid and forms a plurality of housing arches, each of said housing arches comprising a combustion chamber in the form of recess, said combustion chamber being arranged in the half of a respective housing arch which is first swept by said piston means during the relative movement between said housing and said piston means.

9. The combination as claimed in claim 8, wherein said combustion chamber is in the shape of a cylinder having an axis lying parallel to the axis about which said piston means rotates, said piston means being rotated about an excenter shaft.

10. The combination as claimed in claim 8, wherein each of said combustion chambers has a first transition part with said housing arch, said first transition part being formed with a small radius.

11. The combination as claimed in claim 9, wherein said combustion chamber comprises a sparkplug means arranged approximately in the axis of said combustion chamber.

12. The combination as claimed in claim 8, wherein said combustion chamber is subdivided into an ante-chamber and into a main combustion chamber, said main combustion chamber opening into an operating space of the engine, said main combustion chamber of the engine being defined by said housing arch.

13. The combination as claimed in claim 12, wherein said ante-chamber communicates with said main operating space of the engine.

14. The combination as claimed in claim 12, wherein said sparkplug means being provided in said ante chamber and a fuel inlet means providing for a layering of the fuel within said combustion chamber, whereby a portion of said injected fuel is directed to the sparkplug in said ante chamber and the main portion of said fuel is directed into said main combustion chamber.

* * * * *